Jan. 25, 1949.   W. C. STARKEY   2,459,972
TORQUE LIMITING DEVICE
Filed Nov. 1, 1943   3 Sheets-Sheet 1
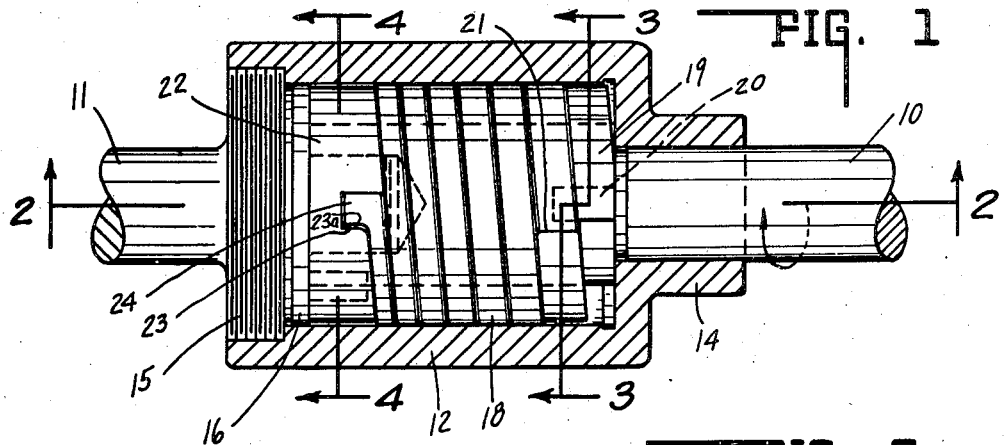
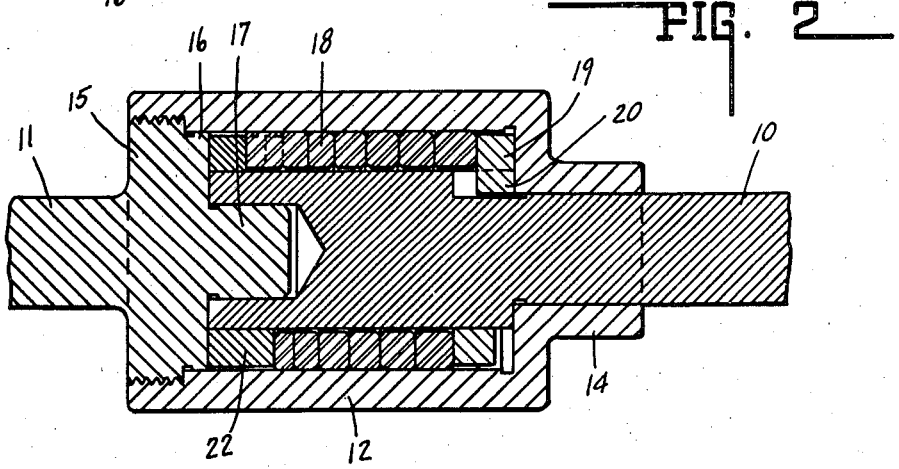
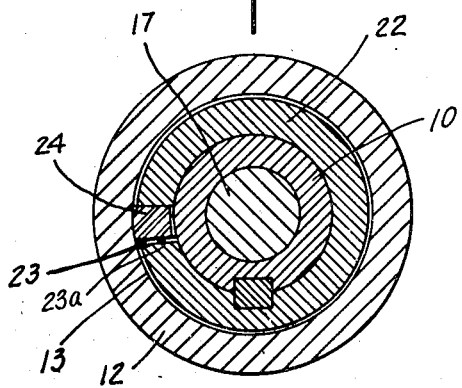
INVENTOR.
WILLIAM CARLETON STARKEY.
BY
Lockwood, Goldsmith & Galt
ATTORNEYS.

Jan. 25, 1949.  W. C. STARKEY  2,459,972
TORQUE LIMITING DEVICE
Filed Nov. 1, 1943  3 Sheets-Sheet 2
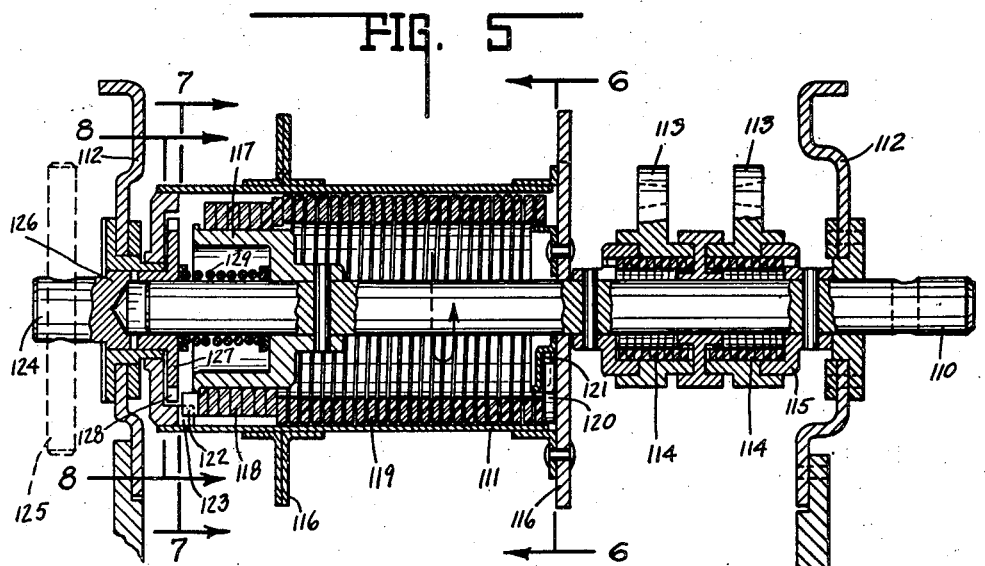
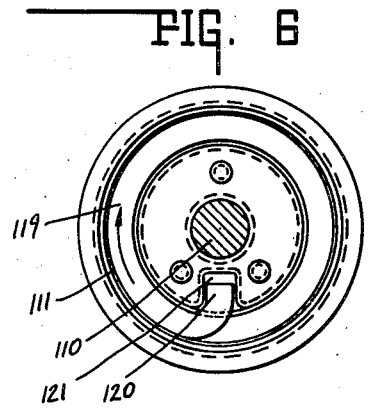
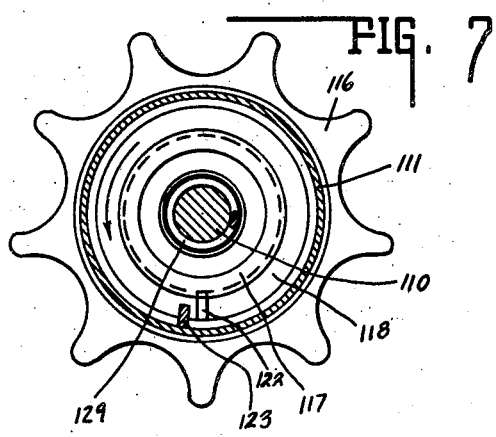
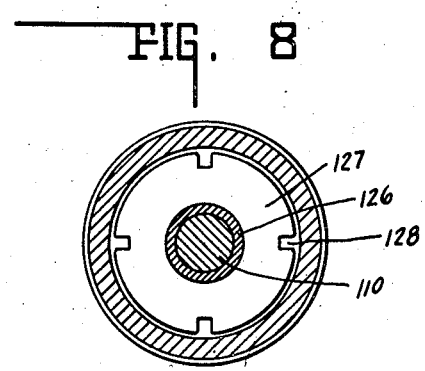
INVENTOR.
WILLIAM CARLETON STARKEY.
BY Lockwood, Goldsmith & Galt,
ATTORNEYS.

Jan. 25, 1949.  W. C. STARKEY  2,459,972
TORQUE LIMITING DEVICE
Filed Nov. 1, 1943  3 Sheets-Sheet 3
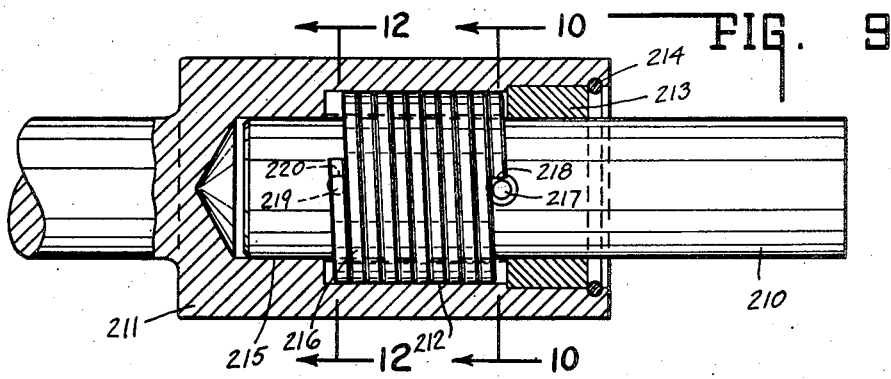
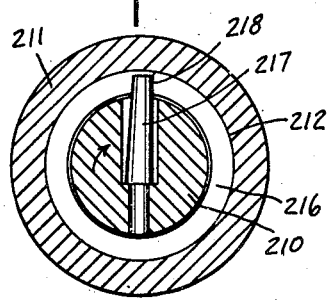 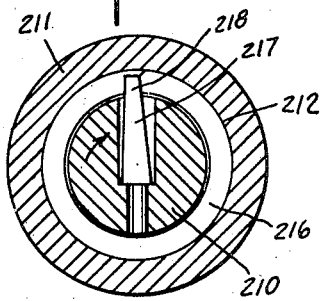 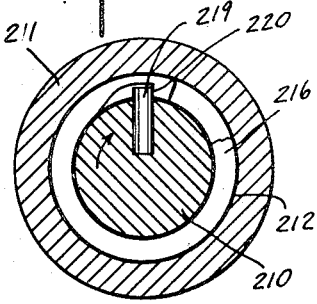
INVENTOR.
WILLIAM CARLETON STARKEY.
BY Lockwood, Goldsmith & Galt
ATTORNEYS.

Patented Jan. 25, 1949

2,459,972

UNITED STATES PATENT OFFICE 2,459,972

TORQUE LIMITING DEVICE

William Carleton Starkey, Indianapolis, Ind., assignor, by mesne assignments, to Fletcher Trust Company, Indianapolis, Ind., a corporation of Indiana, as trustee Application November 1, 1943, Serial No. 508,601

5 Claims. (Cl. 192—56)

This invention relates to a torque limiting device having many applications in respect to a friction driving connection effective to transmit torque up to a predetermined value and becoming ineffective upon an overload being applied to a driven member, and particularly in association with a clutch spring acting as the driving connection between the driving and driven members.

The invention is particularly useful and applicable in maintaining a predetermined driving torque such as may be controlled to a certain number of foot pounds so as to positively maintain a driving connection without slippage up to the predetermined driving torque, while releasing the positive driving connection upon an excess driving torque being applied through overload on the driven member. For example, the invention may be applied to stud, nut and screw drivers, bottle cap applicators, tapping devices and like tools, wherein it is desired that the stud, nut, screw, cap or the like, is to be applied under a predetermined torque so that it is properly set. In such an arrangement the clutch spring drive is responsive to the application of a predetermined torque due to overload on the driven end when the maximum torque is reached, whereupon the clutch spring will be caused to slip and again positively take hold when the applied torque or the overload drops below the predetermined amount. By means thereof, the stud, nut, screw or bottle cap may be applied with a predetermined torque of application.

Another example of the use of this invention resides in the indexing devices for automatic rapid fire guns to prevent damage due to excessive force resulting from jamming, and to provide a positive drive up to a predetermined load, irrespective of variable factors resulting from over heating, weather conditions or the like, such as adversely affect the usual friction clutch devices. Thus, this invention provides a positive clutch drive up to a predetermined overload, for example, twenty-five foot pounds, whereupon slippage will occur until the overload drops below twenty-five foot pounds, so as to maintain a positive driving connection up to such predetermined applied torque and thereafter maintain such applied torque substantially constant.

The principal feature of the invention resides in employing a clutch spring to provide positive clutching connection between the driven and driving members, and operably associating said clutch and a load sensitive element or spring of predetermined sensitivity to load due to the physical characteristics thereof, whereby the clutching action of the clutch spring will be effective through the load sensitive element associated therewith until the overload of the driven member is such as to overcome the resistance of said element, whereupon it will permit the clutch spring to be positively actuated to effect slippage between the driven and driving member until the load is reduced sufficiently to permit said element to react to normal and the clutch spring to again become effective.

The full nature of the invention will be understood from the accompanying drawings and the following description and claims:

Fig. 1 is a plan view of the torque limiting device with the housing shown in longitudinal section. Fig. 2 is a longitudinal section taken on the line 2—2 of Fig. 1. Fig. 3 is a section taken on the line 3—3 of Fig. 1. Fig. 4 is a section taken on the line 4—4 of Fig. 1. Fig. 5 is a modified form of the invention showing a central vertical section through the device. Fig. 6 is a section taken on the line 6—6 of Fig. 5. Fig. 7 is a section taken on the line 7—7 of Fig. 5. Fig. 8 is a section taken on the line 8—8 of Fig. 5. Fig. 9 is a longitudinal section through a further modified form of torque limiting device with the clutch spring and driving shaft in elevation. Fig. 10 is a section taken on the line 10—10 of Fig. 9. Fig. 11 is the same as Fig. 10 with an overload applied to the driven member. Fig. 12 is a section taken on the line 12—12 of Fig. 9 with the overload applied.

In Figs. 1 to 4, inclusive, there is shown one modification or type of torque limiting device wherein there is provided a driving member 10 and a driven member 11. The driving member 10 is in the form of a shaft which may be driven from any suitable source of power or even by hand and through the torque limiting device drives the driven member 11 up to a predetermined applied force. The driven member may be in the form of a shaft with suitable connections, chucks or the like for engaging and applying the drive to studs, nuts, screws or the like.

The driving shaft extends into a housing 12 comprising a clutch pocket or drum with an internal clutch surface indicated at 13. Said housing is provided with a bearing extension 14 at one end thereof for rotatably supporting the shaft 10. The driven shaft is formed with a screw threaded head 15 providing a closure for the opposite end of the housing having a rigid connection therewith. The head 15 is formed with an internal centering portion 16 and an inwardly extending stud 17 to provide an internal bearing support for the free end of the driving shaft 10. Thus, the driving shaft is rotatable within the driven unit comprising the members 11 to 17, inclusive.

Within the pocket formed by the housing 12 there is provided the usual clutch spring 18 which is formed oversize so as to normally engage the clutch surface 13 in frictional clutching engagement, said clutch spring being internally spaced from the shaft 10 so as to freely permit said spring to be wound down out of its normal clutching engagement with the housing to permit slippage.

The driving connection between the driving shaft 10 and the driving clutch spring 18 comprises the load sensitive element in the form of a torsion spring 19 which in this modification resembles an expansible convolute split washer. The outer end of said element is provided with a key 20 extending inwardly into interlocking engagement with the shaft 10. The opposite inner end thereof directly abuts one end of the clutch spring 18 at 21. Said overload release element 19 hugs the shaft but is of reduced diameter in respect to the pocket 12 to permit it to expand under overload conditions.

At the opposite or free end of the shaft 10 there is provided an unloading collar 22 supported for free rotation within the housing and keyed to the driving shaft 10. Said collar is provided with a recess 23 for receiving a toe 24 formed on the adjacent end of the clutch spring 18. The shoulder 23a formed by the recess 23 is normally slightly spaced from the toe 24, whereby there is no effective relation therebetween under normal operating conditions. Thus, the toe 24 of the clutch spring is free floating in the recess 23, the torsion spring 19 being relaxed. However, upon relative rotation between the unloading collar and clutch spring in the driving direction, the shoulder of the recess 23 will engage the toe 24 of the clutch spring and move it in a direction to wrap it down and thereby release it from its normal clutching action with the internal clutching surface of the pocket 12 to permit slippage therebetween.

In operation, the driving and driven members will be interlocked whereby the driving action may be transmitted through the device under normal operating conditions. This is by reason of the fact that the clutch spring is normally in clutching engagement with the pocket of the housing on the driven member and the spring in turn is driven in the direction of its clutching expansion by the torsion spring element 19 through the abutting end thereof at 21, said element being driven through its keyed engagement with the driving shaft. However, upon a predetermined overload being applied to the driven member, resistance to the driving member developed thereby will cause an expanding force to be exerted on the load sensitive element or spring 19, such as to permit relative movement between the driving shaft and the driven shaft and clutch spring 18. Such relative movement will cause the shoulder 23a of the recess 23 in the unloading collar to move the toe 24 in a direction to wind the clutch spring or wrap it down sufficiently from its clutching action with the pocket of the housing to permit slippage. Such slippage will be maintained during the overload condition, such as to maintain the expansion of the load sensitive element, but the moment the overload drops, said element will be permitted to contract and unwind to its relaxed condition permitting the clutch spring to assume its full clutching engagement.

By means of this action the substantially constant predetermined sensitivity to load is maintained and controlled solely by the physical characteristics of the load sensitive element. Thus, for example, if the driving action is set at twenty-five foot pounds, the load sensitive element is so formed as to its physical characteristics, taking into consideration the related characteristics of the clutch spring and other elements, to effect slippage of the clutch upon its overload exceeding twenty-five foot pounds while maintaining the clutching drive up to and including twenty-five foot pounds.

It should be here understood that wherein the clutch spring is normally in clutching engagement with the clutch surface to provide a direct drive between the driving and driven members, the declutching thereof involves progressively varying degrees of wrap down from the energizing end 24 toward the load carrying end 21, depending upon the overload. Thus, there is a slippage of varying degrees to balance the action between the load and the frictional resistance of the coils. This balance of frictional resistance involves the degree of running friction (as distinguished from static friction) which is variably exerted through different coils, increasing from the energizing to the load carrying coils. Such running friction involves slippage of the clutch, and is herein referred to, for convenience, as "declutching" or "releasing" of the spring from the clutch engaging surface as distinguished from the clutching and driving action therethrough.

In the modified form of the invention, as illustrated in Figs. 5, 6, 7 and 8, the device is in the form applicable for use in the indexing mechanism of a machine gun or rapid firing cannon, the purpose thereof being to carry the projectile into firing position through the force stored in a wound up torsion spring. As one example, it may be desirable to exert a force on the indexing reel up to but not beyond twenty-five foot pounds. In event of jamming or obstruction, such as would develop on overload of the indexing reel, it is desired to free the mechanism to avoid breakage. It has heretofore been customary to employ a multiple disk clutch in connection therewith so adjusted as to slip upon the overload development. However, it is difficult to maintain a predetermined load due to variable factors in the characteristics of such a clutch under varying conditions of operation. Therefore, this invention is particularly applicable for use in place of such clutch, in that it is positive in its action such as to cause the clutch to slip when the overload exceeds a predetermined applied force, while positively clutching and driving the mechanism when the applied force is less than a predetermined overload.

In this modified form there is shown the driving member 110 in the form of a shaft. The driven member 111 is in the form of an indexing reel, both the shaft and the reel having their bearing in a suitable housing 112. The shaft 110 is intermittently driven by the spaced arms 113 alternately reciprocated through suitable power means to transmit movement in one direction to the shaft through the spring clutches 114 having their frictional engagement with the hub 115 pinned to the shaft.

The driven member comprising the indexing reel 111 includes the projectile supporting flanges 116 and suitable bearing portions for rotatably supporting said reel upon the shaft 110. Pinned to the shaft for rotation therewith there is a driving hub 117 having an external cylindrical clutch surface with which the clutch spring 118 is normally engaged for rotation therewith. Said clutch spring comprises a series of coils surrounding the driving hub which are normally of lesser diameter so as to normally have friction clutch engagement therewith. Extending forwardly from the clutch spring there is provided a torsion spring 119 having a large number of loosely wound coils integral with and in continuation of the coils of the clutch spring. Said spring 119 freely floats within the body of the reel 111 without engagement therewith other than having its driving end in the form of an inwardly turned toe 120 interlocking with a socket at 121 secured to one of said flanges 116.

It is important to here note that the torsion spring 119, which provides a driving connection between the driving and driven members, comprises the load sensitive element for effecting overload limiting. For that purpose the clutch spring 118 is provided with an outwardly extending toe 122 positioned for engagement with a projection 123 extending inwardly from one end of the reel and so positioned relative to the toe and clutch spring that upon engagement therewith it will expand the clutch spring and thereby tend to release it from clutching engagement with the hub 117.

For convenience, a manual release mechanism is provided for declutching the spring and thereby release any tension built up on the torsion driving spring 119. For that purpose, an exposed manually operated knob 124 is provided in which an operating handle 125 may be mounted, said knob being a continuation of a plunger 126 slidably mounted on the end of the housing 112 and reel 111. Said plunger carries a flange 127 having radial projections 128 normally lying outside of the path of the toe 122 on the clutch spring, but manually slidable into position for engagement therewith under tension of the spring 129 which surrounds the shaft within the hub 117 and is compressible between the wall of the hub and the flange 127. Thus, said spring 129 normally maintains the manually actuated mechanism inoperative, but permits it to be pushed inwardly, whereupon by manual rotation one of the projections 128 engages the toe 122 to expand and release the clutch spring and thereby relieve the torsion spring 119 of its tension.

The operation of the modification as illustrated in Figs. 5 to 8, inclusive, may be briefly described as follows: The driving member 110 is rotated in the direction of the arrow, and through the clutching action of the clutch spring 118 rotates the driven member or indexing reel 111 through the torsion spring 119 which also acts as a load sensitive member or overload spring. If the physical characteristics of the load sensitive member 119 are such as to rotate the driven member under twenty-five foot pounds load, as the load increases up to twenty-five foot pounds, the load sensitive member will cause relative rotation between the driving and driven members 110 and 111, respectively. Such relative rotation through approximately 350° brings the projection 123 on the driven member into engagement with the toe 122 of the clutch spring in a direction tending to unwrap said spring and cause it to declutch the driving member so that the driving force will be temporarily limited until the overload falls below the twenty-five foot pounds, whereupon the driving tension of the spring 119 will cause the toe 122 to walk away from the projection 123 to permit the clutch spring to return to its normal clutching action and thereby effect the driving connection between said members. Similarly, if it is desired to release the tension of the driving spring manually, the knob 124 may be manipulated to cause the projection 128 to be engaged by the toe 122 to expand the clutch spring and cause its release and thereby relieve the driving tension of the spring 119.

An important feature and advantage of this modification is that it permits the clutch spring 118 to freely slip about the hub 117 in the overrunning direction. An overrunning torque limiting clutch is thereby provided for use in those devices wherein the driven member may become the driver. Such overrunning feature is accomplished by having the load carrying end of the spring 118 connected or integral with one end of the load sensitive spring 119 with its deenergizing end 122 free floating, or free from interlocking connection therewith; and wherein a sufficient space between the end 122 and the unloading shoulder 126 is provided under normal or zero torque so that the torsionally stiff load sensitive spring 119 will slip the spring 118 in the overrunning direction before the end 122 and shoulder 123 engage.

The modified form of the invention, as illustrated in Figs. 9 to 12, inclusive, comprises a simplified arrangement for effecting slippage of the clutch spring upon an overload being applied to the driven member. In this form there is illustrated a driving member comprising the shaft 210 and a driven member comprising the pocket providing housing 211, having an internal clutch surface 212. The shaft 210 extends into the pocket 211 concentric therewith and supported by the bearing collar 213 mounted therein with a retaining ring 214, the free end of said driving shaft having its bearing on the bearing surface 215 of said pocket. The clutch spring 216 is mounted about the driving member shaft 210 and is wound oversize so as to normally clutch the surface 212 of the driven member 211. The driving member shaft 210 is provided with a load sensitive element 217 in the form of a resilient spring pin seated in a radially extending pocket of the shaft and projecting outwardly therefrom into abutting engagement with the driving end of the clutch spring, as indicated at 218. A substantial portion of said load sensitive element is free within the pocket of the driving member so as to permit it to be flexed therein upon an overload being applied to the driven member.

At the opposite end of the clutch spring there is provided an unloading element or pin 219 which is mounted in a similar pocket provided in the driving member so as to project radially therefrom. Said pin is arranged to project into a recess in the underside of the clutch spring adjacent one end thereof so as to have slight movement therein but be brought into engagement with a shoulder 220 formed thereby, as shown in Fig. 12.

The operation of this modification is such that the driving member 210 will normally drive the driven member 211 through the clutch spring 216, which is normally in clutching engagement with the clutch surface 212. For this purpose the load sensitive element 217 is caused to rotate with the driving member in a direction to maintain engagement with the end 218 of the clutch spring, tending to expand it into clutching engagement while also providing the driving connection between said driving member and clutch spring. Upon an overload being applied to the driven member, said load sensitive element 217 will yield slightly from its driving position in Fig. 10 to its yielding position in Fig. 11. Such yielding will permit of the relative rotation between the driving member and spring sufficient to cause the unloading element 219 to move in the recess of said spring until it engages the shoulder 220 thereof. Continued relative movement between the driving member and spring will thereupon cause the spring to be wrapped down sufficient to slip relative to the surface 212 to effect slippage between the driven member and the driving member until relieved of the overload, whereupon the load sensitive element 217 will return to its normal position, thereby permitting the spring to expand into its full clutching engagement, and the shoulder 220 on the opposite end of the spring will thereby be caused to walk away from the unloading element 219.

From the foregoing it will be observed that in respect to the various modifications, there is involved in each of them a clutch spring, a load sensitive element, and an unloading element, the load sensitive element being such as to permit relative movement between the driving member and clutch spring or driven member upon a predetermined overload being applied, such relative rotation rendering the unloading element effective to permit slippage of the spring. In this respect it is immaterial as to the form or character of the several members and elements, although the load sensitive element is of a yielding character structurally designed to yield under a predetermined overload. As in some modifications, the clutch spring may be of a character to engage either an internal or external clutching surface with the same effect.

The invention claimed is:

1. A load limiting device including a driving member, a driven member, one of said members being provided with a cylindrical clutch engaging surface concentric with the other member, a cylindrical clutch spring having a series of expansible and contractible coils mounted intermediate said members and movable into and out of clutching engagement with said surface, a load sensitive element connecting one of said members with said spring to transmit driving power to said driven member, said load sensitive element being movable by resistance thereto effective upon a predetermined overload being applied to said driven member to permit relative angular movement between said members, and normally disengaged interconnecting elements between one end of said spring and said one of said members movable into engagement upon such relative movement in a direction to actuate said clutch spring for movement out of clutching engagement.

2. A load limiting device including a driving member, a driven member, said driving member being provided with a clutch engaging surface, a clutch spring having a series of expansible and contractible coils movable into and out of clutch engagement with said surface but normally in clutching engagement therewith, said clutch spring having one end operatively connected with a load sensitive driving torsion spring connected at its opposite end with said driven member and through which said driven member is driven by said driving member, the opposite end of said clutch spring having a projection thereon, and an unloading element in the form of a projection on said driven member normally out of engagement with the projection of said clutch spring and movable into engagement therewith upon relative rotation of said members in a direction to release said clutch spring from clutching engagement with the clutch surface on said driving member, said relative movement being effected upon an overload being applied to said driven member sufficient to overcome a predetermined torsional resistance in said load sensitive driving spring.

3. A load limiting device including a driving member, a driven member, said driving member being provided with a clutch engaging surface, a clutch spring having a series of expansible and contractible coils movable into and out of clutch engagement with said surface but normally in clutching engagement therewith, said clutch spring having one end operatively connected with a load sensitive torsion spring connected at its opposite end with said driven member and through which said driven member is driven by said driving member, the opposite end of said clutch spring being provided with a projecting toe, an unloading element in the form of a projection on said driven member normally out of engagement with the toe of said clutch spring and movable into engagement therewith upon relative rotation of said members in a direction to release said clutch spring from clutching engagement with the clutch surface on said driving member, said relative movement being effected upon an overload being applied to said driven member sufficient to overcome a predetermined torsional resistance in said load sensitive driving spring, and a manually operable unloading device manually movable into engagement with the toe of said clutch spring for moving it out of clutching engagement with said clutch engaging surface.

4. A friction clutch comprising a rotary clutch drum, a coaxial rotary member, a helical clutch spring normally having clutching engagement with said drum under its inherent spring tension, an elastically yieldable torque transmitting element operably interposed between said rotary member and one end portion only of said spring, the opposite end portion of said spring being free floating, said yieldable element being normally relaxed to impart no strain on said clutch spring under zero torque and increasingly strained under increased torque to yield and permit angular displacement between said rotary member and clutch spring, and spring deenergizing means carried by said rotary member operable upon a predetermined angular displacement of said rotary member to move the free end portion of said clutch spring in a direction to effect slippage thereof about said drum.

5. A load limiting clutch including a driving member, a driven member, one of said members being provided with a clutch drum, a helical clutch spring having clutching engagement with said drum, one end of said spring being free floating under normal load, a load sensitive element operably interposed between the other said member and the other end portion of said spring to transmit driving power to said driven member, said load sensitive element being movable by resistance thereto effective upon an overload being applied to said driven member to permit angular movement between said members, and a spring deenergizing means carried by the other of said members normally disengaged from the free floating end of said spring and movable upon said overload into operative engagement with said free floating end to cause slippage of said spring.

WILLIAM CARLETON STARKEY.

REFERENCES CITED

The following references are of record in the file of this patent:

UNITED STATES PATENTS

| Number | Name | Date |
|---|---|---|
| 1,561,537 | Hayes | Nov. 17, 1925 |
| 2,360,187 | Almen | Oct. 10, 1944 |